United States Patent
Unger et al.

(10) Patent No.: US 6,645,461 B1
(45) Date of Patent: Nov. 11, 2003

(54) PROCESS FOR PRODUCTION OF ZEOLITES WITH HIGH SI/AL ATOMIC RATIO

(75) Inventors: Klaus K. Unger, Seeheim (DE); Andreas F. K. Hahn, Bad Soberheim (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 09/463,120

(22) PCT Filed: Feb. 21, 1998

(86) PCT No.: PCT/EP98/01014

§ 371 (c)(1), (2), (4) Date: Jan. 19, 2000

(87) PCT Pub. No.: WO98/38131

PCT Pub. Date: Sep. 3, 1998

(30) Foreign Application Priority Data

Feb. 27, 1997 (DE) .......................................... 197 07 994

(51) Int. Cl.[7] .............................................. C01B 39/02
(52) U.S. Cl. ...................... 423/700; 423/705; 423/709; 423/716
(58) Field of Search ................................ 423/700, 705, 423/709, 716, DIG. 22, DIG. 29, DIG. 34

(56) References Cited

U.S. PATENT DOCUMENTS

| | | | |
|---|---|---|---|
| 3,926,782 A | | 12/1975 | Plank et al. |
| 4,175,114 A | * | 11/1979 | Plank et al. |
| 4,296,083 A | | 10/1981 | Rollmann |
| 4,562,055 A | * | 12/1985 | Arika et al. |
| 4,606,900 A | | 8/1986 | Kacirek et al. |
| 4,797,267 A | * | 1/1989 | Kuehl ................. 423/DIG. 22 |
| 4,871,701 A | | 10/1989 | Danner et al. |
| 5,089,243 A | | 2/1992 | Thome et al. |
| 5,194,410 A | * | 3/1993 | Calabro |

FOREIGN PATENT DOCUMENTS

| | | |
|---|---|---|
| DE | 28 13 969 | 10/1978 |
| DE | 35 37 459 | 4/1987 |
| EP | 01 29 239 | 12/1984 |
| EP | 01 30 809 | 1/1985 |
| JP | 60 11 8624 | 6/1985 |
| JP | 63 26 0809 | 10/1988 |
| WO | WO 80 02 026 | 10/1980 |

* cited by examiner

*Primary Examiner*—David Sample
(74) *Attorney, Agent, or Firm*—Scott R. Cox

(57) ABSTRACT

A process for the production of zeolites with a high Si/Al atomic ratio formed by the conversion of amorphous polysilicas (polysilacic acid) with a source of aluminum ions and optionally a template wherein the conversion occurs at a temperature of less than about 100° C., wherein ammonium hydroxide and/or an alkali metal silicate is added to the conversion solution.

20 Claims, No Drawings

PROCESS FOR PRODUCTION OF ZEOLITES WITH HIGH SI/AL ATOMIC RATIO

DESCRIPTION

The invention concerns a process for production of zeolites with a high Si/Al atomic ratio, especially zeolites from the pentasil group.

Zeolites belong to the class of aluminosilicates and are characterized by a defined pore volume. The structure is made up of $[SiO_4]^{-4}$ and $[AlO_4]^{5-}$ tetrahedra. The Si/Al atomic ratio can be varied over a wide range. A negative excess charge is produced by incorporation of $Al^{3+}$ in the lattice, which is compensated for by cations (mostly alkali or alkaline earth metal cations). After exchange of the cations with the ammonium ions and subsequent calcining the so-called H form of zeolite is obtained. This represents a strong solid acid and has a high ion exchange capacity (IEC). Aluminum or silicon can also be partially replaced in a zeolite by other atoms like boron, iron or gallium so that a broad spectrum of materials is accessible.

As porous solids with defined pore radii, adjustable acidity and hydrophobicity, high heat stability and ion exchange capacity, zeolites have found numerous technical applications, for example, in petrochemistry, where zeolites of the pentasil type, for example, are used in H form as tailor-made catalysts in cracking processes. Zeolites also often find application as drying agents.

In addition to the advantage of easy removability and recovery of the catalyst, the use of zeolites in heterogeneous catalysis generally offers shape-selective catalysis, in which the formation of byproducts is strongly suppressed.

Zeolites have thus far generally been produced under "hydrothermal" conditions, in which a silicon source, an aluminum source, optionally an organic template and a mineralizer (for example, alkali metal hydroxides or fluorides or HF) were converted at more than 100° C. under pressure in the pH range between 4 and 14. Hydrothermal syntheses of zeolites with an Si/Al atomic ratio of more than 20, for example, pentasil, are run in autoclaves at temperatures that are generally higher than 130° C., for example, at 180° C. Low-temperature syntheses of zeolites below the boiling point of water have thus far only been known for aluminum-rich phases, like zeolite X.

The development of a low temperature synthesis of zeolites with a high Si/Al atomic ratio is of technical interest, because the use of autoclaves can be dispensed with on this account. In addition to safer handling, by reducing the reaction temperature to the production costs are reduced. Additionally advantages of pressureless low temperature synthesis are: fewer sources of hazard, simpler operation, simplification of sampling during synthesis, possibilities of on-line investigation during synthesis, better control possibilities during synthesis and more precise control of the reaction temperature by elimination of the pressure parameter.

The underlying task of the invention is to provide a process for production of zeolites with a high Si/Al atomic ratio (high silica) of 40 to ∞, especially zeolites from the pentasil group, which offers the advantages just described over the "hydrothermal" process. Pentasils are understood according to the invention to also include silicalites that contain no aluminum.

The process according to the invention is run by conversion of amorphous polysilica (polysilacic acid) with a source of aluminum ions and optionally a template at temperatures of up to about 100° C. and is characterized in that ammonium hydroxide and/or an alkali metal silicate is added to the reaction solution. A pH value in the range from about 11 to 13, preferably 11 to 12, is generally preferred.

Sodium water glass is preferably used as alkali metal silicate, since this is cheaper than other alkali metal silicates.

The conversion is preferably run at temperatures in the range from 40 to 90° C., especially from 40 to 80° C., in which the reaction rate being reduced at lower temperatures.

Silica hydrogels or pyrogenic silicas are preferably used as amorphous polysilica. Precipitation silicas, however, can also be used.

Essentially all templates used in known zeolite syntheses are appropriate as template. Tetrapropylammonium compounds, for example, tetrapropylammonium bromide, are preferably used.

An Si/Al atomic ratio of more than 75, especially more than 150, is preferably chosen.

Seed crystals of the reaction products can be added to the reaction solution, which is particularly advantageous in synthesis in the presence of ammonium hydroxide.

The reaction solution can also be concentrated in the presence of a support (for example, a vitreous, ceramic or metallic material), in which the reaction product is deposited on the support and enters into a strong bond with it (drying synthesis). Such composite materials can be used as supported catalysts.

Zeolites with a high Si/Al atomic ratio of 40 to ∞ are also an object of the invention, especially zeolites from the pentasil group, which can be obtained according to one of the methods just described with (a) an average particle size of about 0.3 to 0.6 μm, in which 90 wt % of the particles lie in the range from about 0.1 to 0.7 μm, and (b) a crystallinity of more than 95%.

These parameters can be determined as follows:

The average particle size and particle size distribution, as well as the morphology of the crystallites are determined by scanning electron microscopy (SEM), since the morphology of the crystallites with a particle size of less than 1 μm can no longer be determined using a light microscope.

The crystallinity is primarily determined by x-ray powder diffractometry. The intensity of the measured reflections is determined by a comparison with the intensity of a fully crystalline standard. For this purpose the integral intensity of a selected reflection $I_{hkl}$ is used relative to the same reflection of the 100% crystalline standard:

$$\text{X-ray crystallinity} = [I_{hkl} \text{ (sample)}/I_{hkl} \text{ (standard)}] \times 100\%$$

The products according to the invention have a crystallinity of more than 95%.

According to the first variant of the process according to the invention (ammonium-supported synthesis) ammonium hydroxide is added to the reaction solution. This synthesis is characterized by products with a very uniform crystallite size distribution and is explained in example 1.

EXAMPLE 1

1.5 g tetrapropylammonium bromide, 0.12 g $Al_2(SO_4)_3 \cdot 18H_2O$, 1.5 g $H_2O$, 5.3 g colloidal silica sol (Ludox® AS 40)

and 0.1 g pentasil seed crystals were intensively agitated in a beaker to produce a pentasil zeolite. The solution was transferred to a teflon beaker and mixed with 13 mL of 32% $NH_3$ solution, the teflon beaker and the ammonia having been initially cooled with ice water. The reaction solution was then heated for 2 weeks at 90° C. The formed crystallites were filtered off and dried at 100° C. (yield 50%). The crystallites were uniform, twinned crystals. Some intergrown crystals could also be distinguished. The basic shape of the crystallites is more cuboid than rod-like. It could be established by x-ray powder diffractometry that the product had a degree of crystallinity of 100% and was phase-pure.

According to the second variant of the process according to the invention, an alkali metal silicate, preferably water glass, is added to the reaction mixture (water glass-supported synthesis). The sodium water glass serves as a silicon source and, in addition, the pH value can be adjusted with it to less than 13, since the sodium silicate has a certain buffering action. These variants of the process according to the invention can be run without using seed crystals; however, the reaction can be accelerated by adding seed crystals. This variant is explained in example 2.

EXAMPLE 2

(a) 2.5 g of a pyrogenic silica (Aerosil® 200) with a specific surface area of 200 $m^2g^{-1}$ was suspended in 30 mL $H_2O$ in a beaker and added during vigorous agitation to a mixture of 0.08 g $Al_2(SO_4)_{3x}$ $18H_2O$, 1.5 g tetrapropylammonium bromide and 3.6 g sodium water glass (without seed crystals) in 10 mL $H_2O$ and agitated for 15 minutes. The suspension was then transferred to a polypropylene beaker; this was sealed and placed in a furnace preheated to 90° C. The vessel cover was reopened after the reaction temperature was reached in order to achieve atmospheric pressure. The pH value remained constant at 11.8. Workup was carried out by suspending the precipitate in water, centrifuging and drying at room temperature overnight in a diaphragm pump vacuum. The average particle size was about 0.3 μm. The degree of crystallinity was 100%.

Special workup is not required when the reaction solution is concentrated in the presence of a support, in which the reaction solution is fully or for the most part evaporated. In the present case the reaction solution was evaporated in the presence of an unglazed porcelain element, in which an adherent precipitate of intergrown pentasil crystallites formed on the surface of the porcelain element.

(b) A ten-fold larger charge was heated at 75° C. to record the reaction kinetics, a sample being taken every 24 hours. After sampling the samples were dried and calcined at 550° C. X-ray powder diffractograms were recorded of the calcined samples and compared with those of a standard from ammonium-supported synthesis (example 1). Secondary phases or amorphous fractions could not be detected. All samples had a crystallinity of 100%.

Since conversion was run in polypropylene vessels, the progress of the conversion could be followed very well. The reaction mixture was initially a turbid, nonhomogeneous liquid that became milky-turbid after 2 days. After about 3 days a precipitate of honey-like consistency deposited on the bottom of the vessel, which visibly increased significantly in the following days. After 10 to 12 days the solution began to clarify. The pH value of 11.8 remained constant during the entire conversion. The conditions during the conversions at different temperatures are shown in the following table.

TABLE

Reaction conditions and observations

| Reaction temperature | Appearance of precipitate | Clarification of solution |
|---|---|---|
| 40° C. | after about 2 months | after about 22 months |
| 50° C. | after about 1 month | after about 6 weeks |
| 60° C. | after about 2 weeks | after about 4 weeks |
| 75° C. | after about 3 days | after about 12 days |
| 90° C. | after 1 day | after 1 week |

As was expected, a distinct effect of reaction temperature on reaction rate was seen. The induction period, i.e., the period from the start of the reaction to appearance of turbidity, is most strongly influenced by the reduction in reaction temperature.

The induction period at low reaction temperatures, however, can be shortened by using seed crystals (for example, the crystallites of example 1).

Pentasil zeolite appeared during the conversions as an aggregate of regularly twinned crystallites. The size of the crystallites was 90 wt % in the range from 0.1 to 0.6 μm mostly of the crystallites having a diameter of 0.35 μm. It was striking in the SEM photomicrographs that the first crystallites were apparent after 72 hours at a reaction temperature of 75° C. After 120 hours the final particle size was reached, which no longer changed up to the end of the experiment. The particle size distribution was independent of the synthesis temperature over the investigated temperature range, which can be confirmed by the SEM photomicrographs.

All samples were characterized by x-ray powder diffractometry. The degree of crystallinity and phase purity were determined by comparison with the diffractogram of a standard free of secondary phases. Moreover, as an additional characterization method, scanning electron microscopy was used. It was found that the selected charge is optimally suited for production of pentasil since no sample contained a secondary phase.

What is claimed is:

1. A process for the production of zeolite products comprising preparing an amorphous silica or polysilicic acid solution,
adding a source for aluminum ions as well as an ammonium hydroxide solution or an alkali metal silicate solution to obtain a reaction solution,
heating the reaction solution to a temperature of less than about 100° C. to induce conversion to a zeolite product, and
separating and drying the zeolite product.

2. The process of claim 1 wherein the conversion occurs at a pressure of about atmospheric pressure.

3. The process of claim 1 wherein the conversion at a temperature from about 40 to about 90° C.

4. The process of claim 1 wherein the amorphous polysilicic acid comprises a silica hydrogel and wherein the amorphous silica comprises a pyrogenic fumed silica.

5. The process of claim 1 further comprising adding a template to the solution prior to the conversation.

6. The process of claim 5 wherein the template comprises tetrapropylammonium bromide.

7. The process of claim 1 further comprising adding seed crystals to the solution prior to the conversion.

8. The process of claim 1 wherein the zeolites formed by the conversion comprise zeolite particles having an average particle size of about 0.3 to about 0.6 μm, wherein at least about 90 weight percent of the zeolite particles have a particle size within the range of 0.1 to about 0.7 μm.

9. The process of claim 8 wherein the zeolite particles have a crystallinity of at least about 95 percent.

10. The process of claim 8 further comprising adding seed crystals to the reaction solution.

11. The process of claim 8 wherein the conversion reaction occurs at a pH from about 11 to about 13.

12. The process of claim 8 wherein the conversion reaction occurs at a pH from about 11 to about 12.

13. The process of claim 1 wherein the conversion reaction occurs at a pH from about 11 to about 13.

14. The process of claim 7 wherein the conversion reaction occurs at a pH from about 11 to about 12.

15. The process of claim 1, wherein the source for aluminum ions is added to the polysilicic acid solution in an amount such that the Si/Al ratio is at least about 40.

16. The process of claim 15 wherein the zeolite has a Si/Al atomic ratio greater than about 75.

17. The process of claim 15 wherein the zeolite has a Si/Al atomic ratio greater than about 150.

18. The process of claim 15 wherein the source for the aluminum ions comprises $Al_2(SO_4)_3 \cdot 18H_2O$.

19. The process of claim 1 further comprising concentrating the zeolite product in the reaction solution in the presence of a support, whereby the zeolite product is deposited on the support.

20. The process of claim 1 wherein the ammonium hydroxide solution and the alkali metal solution are added to obtain the reaction solution.

* * * * *